United States Patent [19]
Scholle

[11] 3,956,012
[45] May 11, 1976

[54] STORAGE BATTERY PLATES OF PLASTIC AND LEAD

[75] Inventor: William R. Scholle, Long Beach, Calif.

[73] Assignee: Scholle Corporation, Compton, Calif.

[22] Filed: June 10, 1974

[21] Appl. No.: 478,149

[52] U.S. Cl. ................................. 136/58; 136/65
[51] Int. Cl.² ................................. H01M 35/08
[58] Field of Search ............... 136/36, 65, 27, 26, 136/63, 64, 38, 48, 58

[56] References Cited
UNITED STATES PATENTS

| | | | |
|---|---|---|---|
| 3,269,863 | 8/1966 | Helms | 136/36 |
| 3,556,854 | 1/1971 | Wheadon et al. | 136/63 |
| 3,738,871 | 6/1973 | Scholle | 136/65 |
| 3,772,084 | 11/1973 | Scholle | 136/27 |
| 3,813,300 | 5/1974 | Shima et al. | 136/38 |

*Primary Examiner*—Anthony Skapars
*Attorney, Agent, or Firm*—Elwood S. Kendrick

[57] ABSTRACT

Storage battery plates of the accumulator type comprising in principal part plastic material, and consisting essentially of a rigid polymer plastic frame having an open window therein, a grid in said window comprising a plurality of intersecting horizontal and vertical non-conductive members connected to said frame, a strand of lead disposed in said window and supported by said grid in a non-intersecting pattern, a terminal connected to said strand, and battery paste covering said grid and strand.

18 Claims, 3 Drawing Figures

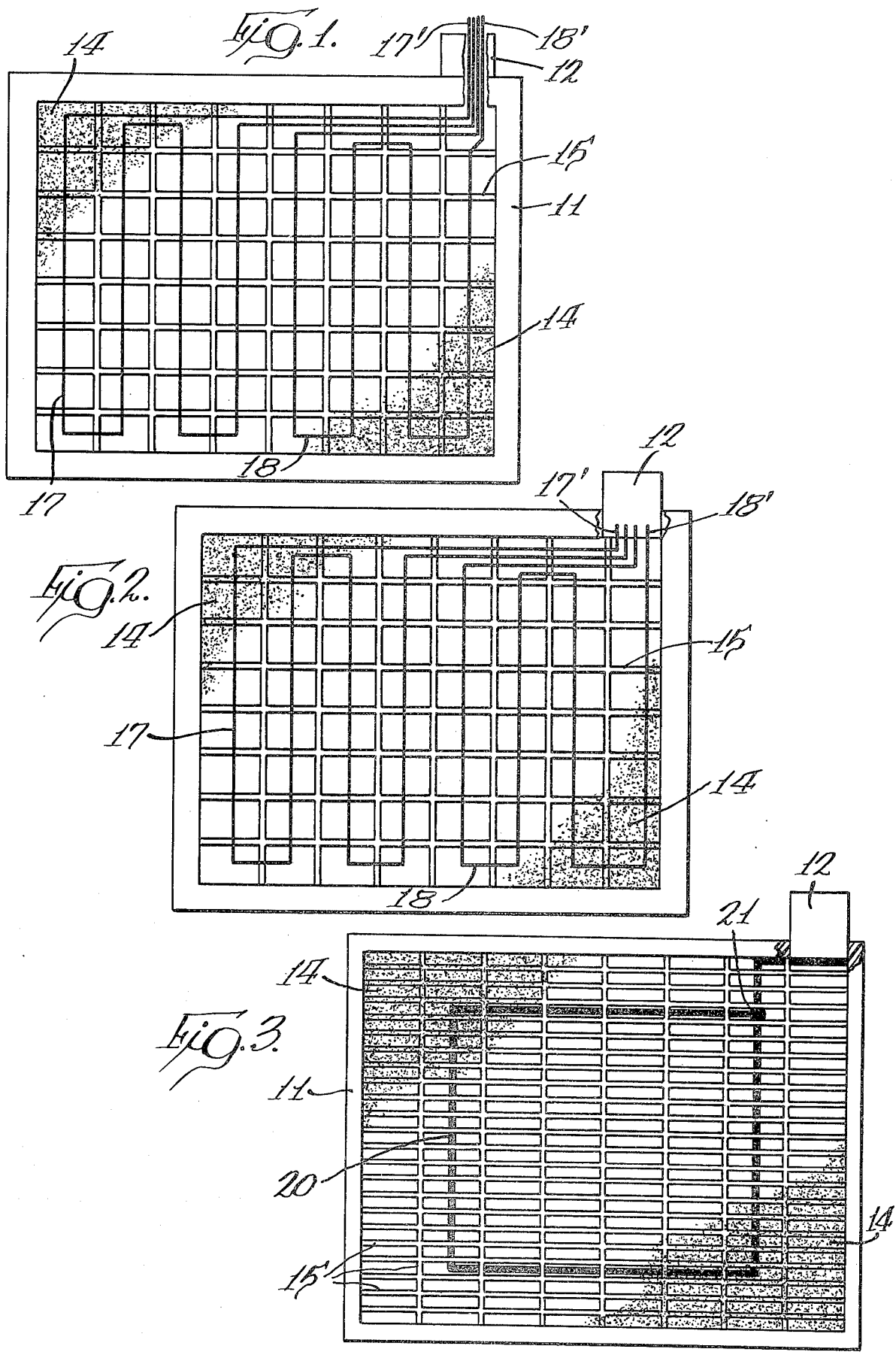

STORAGE BATTERY PLATES OF PLASTIC AND LEAD

CROSS REFERENCE

This application is directed to the subject matter of my earlier issued U.S. Pat. No. 3,738,871, granted June 12, 1973 and my abandoned application, Ser. No. 125,309 filed Mar. 17, 1971.

BACKGROUND OF THE INVENTION

Lead Alloy Grids

The present day standard battery grids are made from lead to which approximately 4% to 6% of antimony has been added as a stiffener since a pure lead grid would be quite soft and unmanageable in the conventional process of battery plate manufacture. The present grids for automotive batteries weigh about from 60 to 70 grams and the grids serve a dual purpose of being an electrical conductor and acting as a mechanical frame to hold lead oxide paste. When the grid is pasted it is then called a battery plate. Lead is used in the grids since it is relatively insoluble in sulfuric acid which serves as the electrolyte. Other metals that are good conductors such as copper are soluble in sulfuric acid and would poison a lead acid battery.

As is well known, the conventional battery grid generally comprises a rectangular frame formed with rectangular openings and a laterally projecting lug on its upper edge by means of which a plurality of grids of similar polarity may be fused together or electrically connected in parallel by a bar leading to a battery post.

Normally, the conventional battery grid having a substantially rectangular frame portion, is manufactured by covering the individual grids with a paste of lead oxide containing some sulfuric acid. These pasted grids are then dried and subjected to an electrical charge while in sulfuric acid whereby one group of plates called the negative plates have their lead oxide converted to lead and another group of plates called the positive plates have their lead oxide converted to lead peroxide. A series of such plates are then placed in a cell with alternating negative and positive plates positioned so that the end plates in each cell are negative. Insulated separators such as fluted wood, perforated rubber, glass fiber reinforced compositions and the like, are placed between each battery plate and the battery casing is then filled with a dilute solution of sulfuric acid.

The porous separators which are placed between the alternating negative and positive plates have the primary object of preventing metallic contact between the plates of opposite polarity while freely permitting electrolytic conduction.

A cell comprises a number of plates, the positive plates being connected in parallel with each other and the negative plates being connected in parallel with each other so that the entire cell has a desired amperage and a voltage of approximately 2.1 volts. Depending on the desired voltage of the battery, the requisite number of cells are then connected in series, for example, six cells connected in series to provide a 12 volt battery.

Composite Lead Alloy and Plastic Grids

It has been proposed heretofore to replace with a polymer plastic some alloy in the grids, and still have sufficient lead alloy present to serve as an adequate electrical conductor. This conserves lead and should produce a lighter weight, more economical grid.

A generally conventional but somewhat modified lead alloy grid supplemented with perforated plastic sheets for retaining the battery paste is shown in U.S. Pat. Nos. 3,083,250 and 3,247,023. U.S. Pat. Nos. 2,694,100; 3,269,863; 3,516,864 and 3,607,412 disclose various embodiments of the common concept of forming the grid entirely from plastic and then coating it with metal, particularly lead alloy, conventionally by a metallizing spray. In U.S. Pat. No. 3,556,855, it was proposed to form the grid from a conductive plastic comprising a moldable resin and metal coated glass fibers.

In each of the above patents, the entirety of the grid was conductive, including the border or frame of the grid, and in the latter two categories at least the conductivity of the grid was impaired by the inherent necessity for a relatively thin metal coating, resulting in conductive components of very thin cross-section.

The patent to Wheadon et al, U.S. Pat. No. 3,556,854, improved upon the above prior art by providing a non-conductive polymer plastic grid, including a non-conductive border or frame, with a separate fan-like conductor element fused to the grid. In Wheadon, the grid was comprised of a non-conductive rectangular frame and a plurality of non-conductive diagonal grid wires; the conductor was comprised of an element having a juncture for forming the grid lug and a plurality of fingers, formed by splitting a strip of metal, diverging from the juncture in fan-like manner and extending diagonally across the plastic grid; and the conductor was formed with a dovetail groove in each finger (and thus of reduced cross-section); and the conductor was fusion-locked to the grid by heating the conductor and pressing it into the material of the grid.

The Wheadon device, however, was not completely satisfactory. Although the grids were lighter than those previously available, the use of a number of diverging fingers eminating from a central juncture was undesirable. Even if separate conductive elements were joined at the lug, the manufacture of such a grid would be complicated and costly, requiring an inventory of each differently sized element and the proper sequential installation of each such element. Additionally, the Wheadon device employs a great number of substantial lead fingers which are not uniformly spaced throughout the grid, inherent from the fanning feature.

In my U.S. Pat. No. 3,738,871, a number of embodiments of battery plates constituting improvements over Wheadon et al and the remainder of the above prior art, particularly in terms of strength, practicality, ease of fabrication, high conductivity and reliability, were disclosed. In each embodiment, the frame of the grid is non-conductive, the conductor is of significantly reduced amount but still of adequate cross-section, and the components have such interrelation as to produce a composite grid capable of being readily manufactured and reliably handled in the conventional process of battery plate manufacture.

This new type of grid in general constitutes a composite of lead and plastic in which there may be one or more pieces of either in composite assembled form, sandwiched form or overlaid or inlaid. Conductivity is maintained at an entirely satisfactory level, yet the amount of lead is reduced by up to 75% or more by weight over a conventional battery grid, and the lead is replaced by a light-weight economical plastic polymer. A particularly suitable plastic is polystyrene, others being polyethylene, polypropylene, polycarbonates and acrylates. One requisite of the plastic component is that there be enough stiffness to go through the conventional pasting machine in the manufacture of the battery plates.

The result is that there is a saving in the amount of lead, and a saving in weight and overall battery cost. Also, alloying metals, such as antimony which causes self-discharge of the battery, can be eliminated and this makes possible the production of wet batteries which substantially retain their charge until placed in use. The rigidity of the plastic makes possible the use of pure soft lead with resultant long shelf life.

In addition, by employing battery plates wherein at least the frame is composed of plastic, the frame has the advantage of preventing bridging between adjacent positive and negative plates.

Summarizing the foregoing, and in accordance with the invention, plastic replaces more expensive lead or lead alloys resulting in savings in battery costs; it will become possible to save 5 to 10 pounds in the weight of the conventional automobile storage battery which would save considerably in freight costs in shipping the battery from the manufacturer to the point of installation, and for example, a 20% weight saving in motive power of heavy duty batteries would make the battery-operated automobile more feasible.

Furthermore, such materials as antimony, calcium and other materials which are used in stiffening lead, can be largely or wholly eliminated, these materials not only being expensive but costly to incorporate with the lead and to control. Elimination of the alloy system eliminates battery self-discharge and thus permits acid to be added to the battery long before the battery is to be used. In accordance with the invention, a very soft or pure lead grid can be supported by stiff plastic.

In my U.S. Pat. No. 3,738,871, I claimed certain species of my invention wherein the lead or conductive part of the battery plate is comprised of intersecting lead wires, i.e., the unitary lead grid of intersecting spaced parallel horizontal and vertical wires supported within a polymer plastic frame as shown in FIGS. 1 and 3 of said patent, the unitary grid comprised of an expanded metal matrix supported within a polymer plastic frame as shown in FIG. 9 of said patent, and the grid of intersecting spaced parallel horizontal and vertical wires supported by the grid-work of a complete plastic grid as shown in FIGS. 2 and 4 to 6 of said patent.

The present application is directed to the composite of a complete plastic frame and grid and a continuous, non-intersecting strand of lead disposed within the frame and supported by the plastic grid, and also to an improved grid embodying intersecting conductive lead wires.

A single non-intersecting strand of lead can be readily formed to the desired configuration for mounting on the plastic grid, or for mounting or formation in the grid mold so that the plastic may be cast about it. One or more such strands, all in non-intersecting relation, may be employed.

In particular, simple extruded lead can be used at the conductive part of the plate, thereby to minimize waste, eliminate the problem of defective or rejected molded components, and facilitate the use of pure lead for the conductor. Also, the simplicity enhances the provision of a conductor of sufficient cross-section for good conductivity. All of these features are absent in Wheadon.

Further, a grid embodying a single closed loop of conductive lead will further lighten the battery and reduce the amount of lead required in the battery. The closed loop may be of rectangular, square, oval, circular or any other desired shape, without substantially reducing the effectiveness of the plate when compared with the standard cell.

In addition, more than one closed loop may be employed on the grid, such closed loops being positioned within a larger closed loop, so as to increase the desired amount of conductive material, thus further approaching the same effectiveness as the standard cell construction.

Other advantages and economies of the invention, and the details of construction and arrangement of the component parts, will be apparent from a consideration of the following specification and accompanying drawings.

THE DRAWINGS

FIGS. 1 and 2 are plan views of two forms of composite lead-plastic battery plates formed in accordance with the invention.

FIG. 3 is a plan view of a further modification of the same subject matter disclosing a grid having a closed loop of conductive material.

DETAILED DESCRIPTION

Referring to the drawings, and particularly FIG. 1, there is shown a battery plate comprising a plastic frame 11 with a plastic grid portion 15 which may be molded integrally therewith or separately joined thereto.

The plastic grid work 15 extends both horizontally and vertically to leave open spaces for reception of lead paste 14 in the conventional manner as previously described.

A lead lug 12 extends from the frame for connecting a group of plates and to this lead lug there is connected one or more lead wires 17 and/or 18. Thus, in the form of FIG. 1, there is a frame 11 of plastic and a composite grid formed of the transverse and vertical plastic components 15 and a lead wire component 17 and/or 18 connected to the lug 12. The lead wires in this form are shown to intersect and terminate at the lug 12 in the ends 17' and 18' whereat they may be welded together or used in combination with or in simulation of the lug 12.

The lead wires 17 and 18 terminating at ends 17' and 18', respectively, form two closed loops of conductive material within the frame 11, each said closed loop separate from the other. It is also recognized that one of the two closed loops could be included either entirely or partially within the area bounded by the other.

In the modified form of FIG. 2, a construction is shown similar to that of FIG. 1 in that it also comprises the plastic frame 11, plastic grid 15, lug 12 and two lead wires 17 and 18 terminating at 17' and 18' in the lug 12. In this case, the terminals 17' and 18' of the lead wires are connected to the cast lug 12 as distinguished from the arrangement of FIG. 1 wherein the terminals 17' and 18' extend outwardly of the lug 12 and act in lieu thereof.

In other words, instead of the wires 17 and 18 being connected to a lead lug 12 it will be understood that the wires can be looped outwardly of the frame 11 so as to form a usable facsimile of the lug 12 for connection of an alternate group of plates in parallel as is conventional.

The lead wires 17 and 18 may also intersect one another and be joined at a juncture such as shown by juncture 21 in FIG. 3. The term "non-intersecting" is used herein to refer to intersections other than at a juncture for connecting any conductive lead wires to a lug.

Relative to the plastic elements, the grid 15, that is the terminal vertical and horizontal portions thereof, extend into the frame 11 in reinforcing engagement therewith. The grid 15 may be formed integrally with the frame 11, or the terminal portions of the grid may be set into recesses in the plastic frame 11 after the frame 11 has been separately fabricated.

The lead component can be set or staked into recesses in the plastic grid 15, or in the alternative, the frame 11 and grid 15 can be molded about and in interlocking engagement with the lead.

It will thus be understood that the lead can be embedded in the plastic frame and grid in an injection molding process, or plastic that has been fabricated by extrusion, stamping, vacuum forming and other processes may be joined with the lead by laminating, inserting, imbedding or other means.

In both FIGS. 1 and 2, there are two lead wires 17 and 18, both of which comprise a unitary or integral single strand of lead, and neither of which intersects itself or the other. Each strand is arranged in an undulating pattern which is preferably of rectangular wave form having individual horizontal and vertical segments each of which parallels a respective side of the frame 11, and each of which intersects, and preferably bisects, the grid openings or spaces over which it passes. While the lead strands are illustrated as being parallel to the sides of frame 11, it is recognized that the lead strands may form an irregular path not parallel in all instances to the sides of frame 11.

Referring to FIG. 3, a modified version of the composite plastic-lead plate is shown wherein a single strand 20 of lead is supported on or in the non-conductive plastic grid 15 within the window defined by the non-conductive plastic frame 11 in spaced parallel relation to the four sides of the frame, the lead strand being in the form of a closed loop and having a common end terminating in the lead lug 12.

The strand may be and preferably is molded within the grid, or it may be staked to the grid after molding. The strand or wire is preferably a unitary or integral piece of single strand lead. If desired, the strand or wire can be tacked or soldered at one end, as at 21, to the end portion thereof that runs to the lug 12, or both ends can be connected to the lug.

The non-conductive plastic grid is preferably molded integral with the frame and is comprised of fairly closely spaced vertical and horizontal bars to define a structurally sound and essentially rigid grid which affords firm support for the soft lead and which can be reliably and safely handled by the conventional grid pasting machinery.

The strand 20 is of sufficient cross-section to efficiently carry the paste converting and battery charging currents, and preferably bisects the paste receiving spaces in the grid throughout its path, whereby to have intimate contact with and effectively convert the paste in the conversion process.

The use of a single strand of lead as shown in FIG. 3 in the form of a rectangular closed loop is believed to provide substantially the same effectiveness of operation of the standard cell with vast savings in weight and lead even as when compared to the grid disclosed in the Wheadon patent.

It is recognized, as indicated above, that while a rectangularly shaped closed loop is shown in FIG. 3, other geometric figures, such as circles, ovals, squares, trapezoid or other regular or irregular area enclosing closed loops may be employed. Further, if increased conductive material is desired to be used, one geometric configuration may be enclosed entirely within another.

Although I have shown and described the preferred embodiments of my invention, it will be understood by those skilled in the art that changes may be made in the details thereof without departing from its scope as comprehended by the following claims.

What is claimed is:

1. A storage battery plate consisting essentially of a rigid polymer plastic frame having a window therein, a grid in said window in the form of a plurality of intersecting polymer plastic members connected to said frame, and free of electrical conductivity; at least one strand of lead disposed in said window and supported by said grid, said at least one strand free of intersection with another said strand; a plate terminal connected to said strand; and battery paste filling said grid and covering said strand.

2. A storage battery plate as set forth in claim 1 wherein said frame and grid are unitary and said at least one strand is molded in said grid.

3. A storage battery plate as set forth in claim 1 wherein said strand is one integral length of lead arranged in said window in a pattern free of intersection with said length of lead.

4. A storage battery plate as set forth in claim 1 wherein said at least one strand forms at least one loop free of intersection with another loop.

5. A storage battery plate as set forth in claim 4 wherein said at least one strand is disposed in the form essentially of a regular geometric configuration.

6. A storage battery plate as set forth in claim 4 wherein said at least one strand is disposed in the form of a rectangular loop.

7. A storage battery plate as set forth in claim 4 wherein said at least one strand forms at least one essentially rectangular loop having its sides adjacent and parallel to the sides of the frame.

8. A storage battery plate as set forth in claim 1 wherein less than three loops are formed by said strands.

9. A storage battery plate as set forth in claim 8 wherein said loops exclude any common plate area.

10. A storage battery plate as set forth in claim 9 wherein one of said loops is disposed entirely within said other loop.

11. A storage battery plate as set forth in claim 1 wherein said at least one strand is arranged in a undulating pattern.

12. A storage battery plate as set forth in claim 11 wherein said undulating pattern is disposed in a rectangular wave form with the segments thereof paralleling the sides of said frame.

13. A storage battery plate as set forth in claim 1 wherein said at least one strand is essentially pure lead.

14. A storage battery plate as set forth in claim 1 including a plurality of said strands.

15. A storage battery plate consisting essentially of a rigid rectangular polymer plastic frame having a window therein, a grid in said window comprising a plurality of intersecting horizontal and vertical polymer plastic members connected to said frame, and free of electrical conductivity; a single strand of lead comprised of horizontal and vertical segments disposed in said window and supported by said grid, said segments free of intersection with one another; a plate terminal connected to said strand; and battery paste filling said grid and covering said strand.

16. A storage battery plate as set forth in claim 15 wherein said horizontal and vertical segments of said strand traverse all the paste receiving openings in said grid.

17. A storage battery plate comprising a rigid polymer plastic frame having a window therein, a grid in said window in the form of a plurality of intersecting polymer plastic members connected to said frame and free of electrical conductivity; one strand of lead disposed in said window and supported by said grid, said strand free of strand intersections along the length thereof; a plate terminal connected to said strand; and battery paste filling said grid and covering said strand.

18. A storage battery plate consisting essentially of a rigid polymer plastic frame having a window therein, a grid in said window in the form of a plurality of intersecting polymer plastic members connected to said frame, and free of electrical conductivity; one strand of lead disposed in said window and supported by said grid, said strand forming an essentially rectangular loop having its sides adjacent and parallel to the sides of the frame, said one strand being free of intersections with said strand; a plate terminal connected to said strand; and battery paste filling said grid and covering said strand.

\* \* \* \* \*